(12) United States Patent
Lin (10) Patent No.: US 11,090,745 B2
(45) Date of Patent: Aug. 17, 2021

(54) TORQUE-ADJUSTABLE TAPPING APPARATUS

(71) Applicant: Pard Hardware Industrial Co., Ltd., Taichung (TW)

(72) Inventor: Ta-Sen Lin, Taichung (TW)

(73) Assignee: Pard Hardware Industrial Co., Ltd., Taichung (TW)

( * ) Notice: Subject to any disclaimer, the term of this patent is extended or adjusted under 35 U.S.C. 154(b) by 174 days.

(21) Appl. No.: 16/369,093

(22) Filed: Mar. 29, 2019

(65) Prior Publication Data

US 2019/0344369 A1 Nov. 14, 2019

(30) Foreign Application Priority Data

May 8, 2018 (TW) .................................. 107115499

(51) Int. Cl.
*B23G 1/28* (2006.01)
*B23G 1/16* (2006.01)
*B23G 3/00* (2006.01)

(52) U.S. Cl.
CPC .................. *B23G 1/28* (2013.01); *B23G 1/16* (2013.01); *B23G 3/005* (2013.01)

(58) Field of Classification Search
CPC ... B25B 23/141; B25B 23/12; B25B 23/1427; B25B 21/008; B25B 23/1422; B25B 23/142; B25B 23/16; B25B 23/1453; B25B 23/1475; B25B 21/026; B25B 21/023; B25B 23/1425; B25B 23/14; B25B 23/159; B23G 5/06; B23G 5/14; B23G 5/20; B23G 5/182; B23G 2240/44; B23G 1/264; B23G 1/28; B23G 1/16; B23G 1/26; B23G 1/261; B23G 1/30; B23G 1/46; B23G 2200/46; B23G 5/08; F16D 7/044; F16D 11/14; F16D 23/12; F16D 7/00; F16D 23/00; F16D 43/20; B23B 31/086; B23B 31/107; B23B 31/1071; B23B 31/083; B23B 2231/54; F12D 7/00

See application file for complete search history.

(56) References Cited

U.S. PATENT DOCUMENTS

| | | | |
|---|---|---|---|
| 7,484,442 B1 * | 2/2009 | Chen .................... | B25B 23/1427 81/474 |
| 9,731,407 B1 * | 8/2017 | Edmisten .............. | B25B 13/481 |
| 2011/0113936 A1 * | 5/2011 | Chiang ............... | B25B 23/1427 81/483 |

* cited by examiner

*Primary Examiner* — Shelley M Self
*Assistant Examiner* — Marvin Mercado
(74) *Attorney, Agent, or Firm* — Alan D. Kamrath; Karin L. Williams; Mayer & Williams PC (57) ABSTRACT

A torque-adjustable tapping apparatus includes a tap, a wrench and a torque-adjusting mechanism including a shell, a primary adjuster and a clutch. The shell is connected to the wrench. The shell includes an internally threaded section. The primary adjuster includes an externally threaded section engaged with the internally threaded section. The clutch includes an upper gear and a lower gear. The upper gear includes teeth extending from a lower face and at least one restraining cutout in a periphery. The lower gear includes teeth extending from an upper face and a connective rod extending from a lower face. The teeth of the lower gear are engaged with the teeth of the upper gear. The connective rod is connected to the tap. At least one screw is inserted in the restraining cutout through the screw hole. A spring is compressed between the primary adjuster and the upper gear.

7 Claims, 10 Drawing Sheets

TORQUE-ADJUSTABLE TAPPING APPARATUS

BACKGROUND OF INVENTION

1. Field of Invention

The present invention relates to a tapping apparatus and, more particularly, to a torque-adjustable tapping apparatus.

2. Related Prior Art

Figure 10:
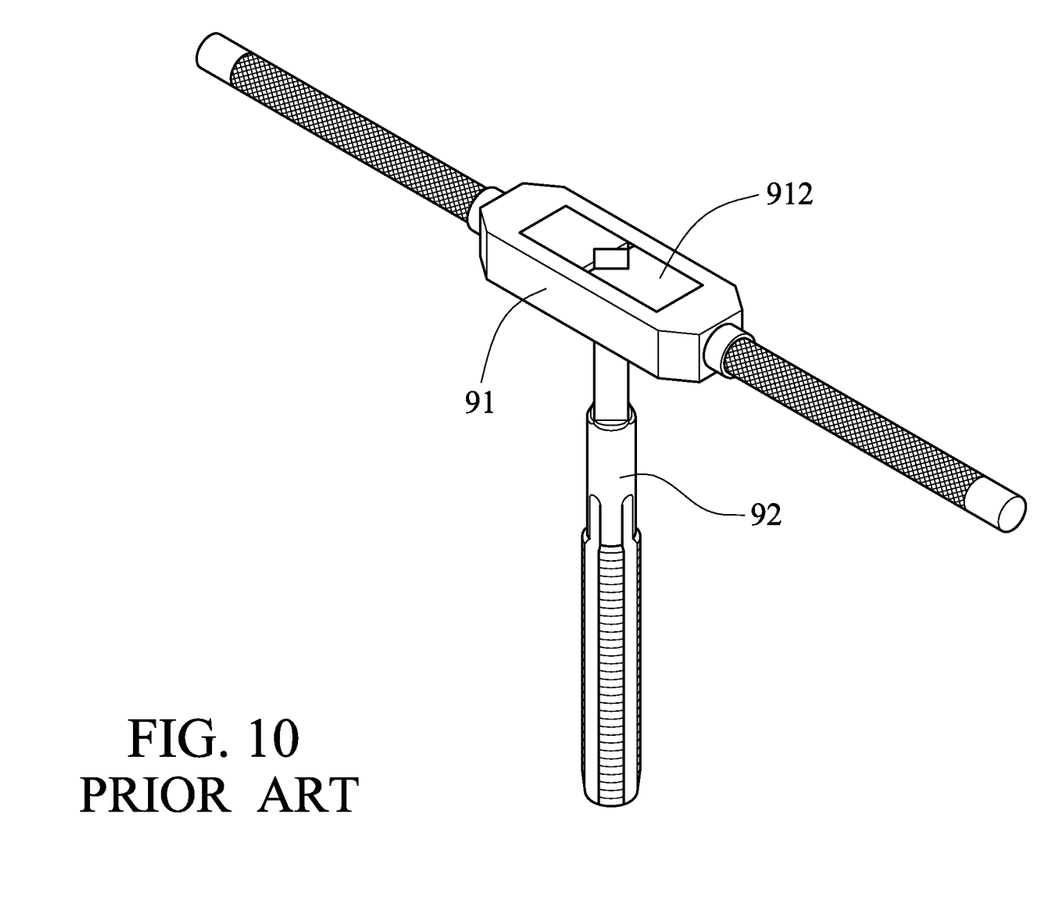
FIG. 10 is a perspective view of a conventional torque-adjustable tapping apparatus.

Referring to FIG. 10, a conventional tapping apparatus includes a wrench 91 and a tap 92. The tap 92 can be rod-shaped for making an internal thread (or 'screw hole') as shown or ring-shaped for making an external thread (not shown). The tap 92 includes a square shank (not numbered) inserted in square hole made in the wrench 91. A locking mechanism 912 is used to lock the wrench 91 to the tap.

A user can rotate the wrench 91 to rotate the tap 92 to make an internal thread in a work-piece (not shown). The angle of the tap 92 relative to the work-piece, the speed of feeding the tap 92 in the work-piece and debris produced in the tapping can entail increased resistance against the tapping. It would be better to adjust the feed of the tap in the work-piece to render the tapping smooth.

However, it takes experience to feel the resistance against the tapping. The user might stop the tapping too late to avoid fracture of the tap 92 in the work-piece. Such fracture inevitably increases the time and cost of the tapping.

The present invention is therefore intended to obviate or at least alleviate the problems encountered in prior art.

SUMMARY OF INVENTION

It is the primary objective of the present invention to provide a torque-adjustable tapping apparatus.

To achieve the foregoing objectives, the tapping apparatus includes a tap, a wrench and a torque-adjusting mechanism. The torque-adjusting mechanism includes a shell, a primary adjuster and a clutch. The shell is connected to the wrench. The shell includes an axial hole made throughout the shell in an axial direction, an annular portion formed at an end of the shell, an internally threaded section formed on an internal face of the shell, and a screw hole made throughout the shell in a radial direction and in communication with the axial hole. The primary adjuster includes an enlarged head and an externally threaded section extending from the enlarged head. The externally threaded section is engaged with the internally threaded section. The clutch includes an upper gear and a lower gear. The upper gear includes teeth extending from a lower face and at least one restraining cutout in a periphery. The lower gear includes teeth extending from an upper face and a connective rod extending from a lower face. The teeth of the lower gear are engaged with the teeth of the upper gear. The connective rod extends is connected to the tap. At least one screw is inserted in the restraining cutout through the screw hole. A spring is compressed between the primary adjuster and the upper gear, thereby pressing the upper gear against the lower gear.

Other objectives, advantages and features of the present invention will be apparent from the following description referring to the attached drawings.

BRIEF DESCRIPTION OF DRAWINGS

The present invention will be described via detailed illustration of three embodiments versus the prior art referring to the drawings wherein.

DETAILED DESCRIPTION OF EMBODIMENTS

Referring to FIGS. 1 through 7, a torque-adjustable tapping apparatus includes a tap 92 (FIG. 10), a wrench 60 and a torque-adjusting mechanism. The torque-adjusting mechanism includes a shell 10, a primary adjuster 20, an indicator 31, a panel 32, a minor adjuster 33, a spring 34, a connector 35, a clutch 40 and a joint 50 according to the preferred embodiment of the present invention.

Referring to FIGS. 1 through 4, the shell 10 includes an axial hole 11, an annular portion 12, an internally threaded section 13 and a window 14. The axial hole 11 is made throughout the shell 10. The annular portion 12 is formed at a lower end of the shell 10. The annular portion 12 inherently includes an aperture. The aperture of the annular portion 12 is smaller than and in communication with the axial hole 11. The internally threaded section 13 extends on an internal face of the shell 10 and is located in upper and middle sections of the axial hole 11. The window 14 is made throughout the shell 11 in a radial direction and in communication with the axial hole 11, corresponding to the internally threaded section 13. The window 14 can however be omitted in another embodiment.

Referring to FIGS. 1 through 3 and 5, the primary adjuster 20 is engaged with the shell 10. The primary adjuster 20 includes an enlarged head 21, an externally threaded section 22, an axial bore 23, a partition 24, a screw hole 25 and an annular groove 26. The externally threaded section 22 is engaged with the internally threaded section 13 of the shell 10. The axial bore 23 is made throughout the primary adjuster 20. The partition 24 extends on an internal face of the primary adjuster 20, thereby dividing the axial bore 23 into an upper section 232 and a lower section 234. The screw hole 25 is made throughout the partition 24. The screw hole 25 is coaxial with the axial bore 23. The pitch of the screw hole 25 is smaller than the pitch of the internally threaded section 13 of the shell 10. The annular groove 26 is made in an external face of the externally threaded section 22. The annular groove 26 is located corresponding to the window 14 of the shell 10.

Figure 2:
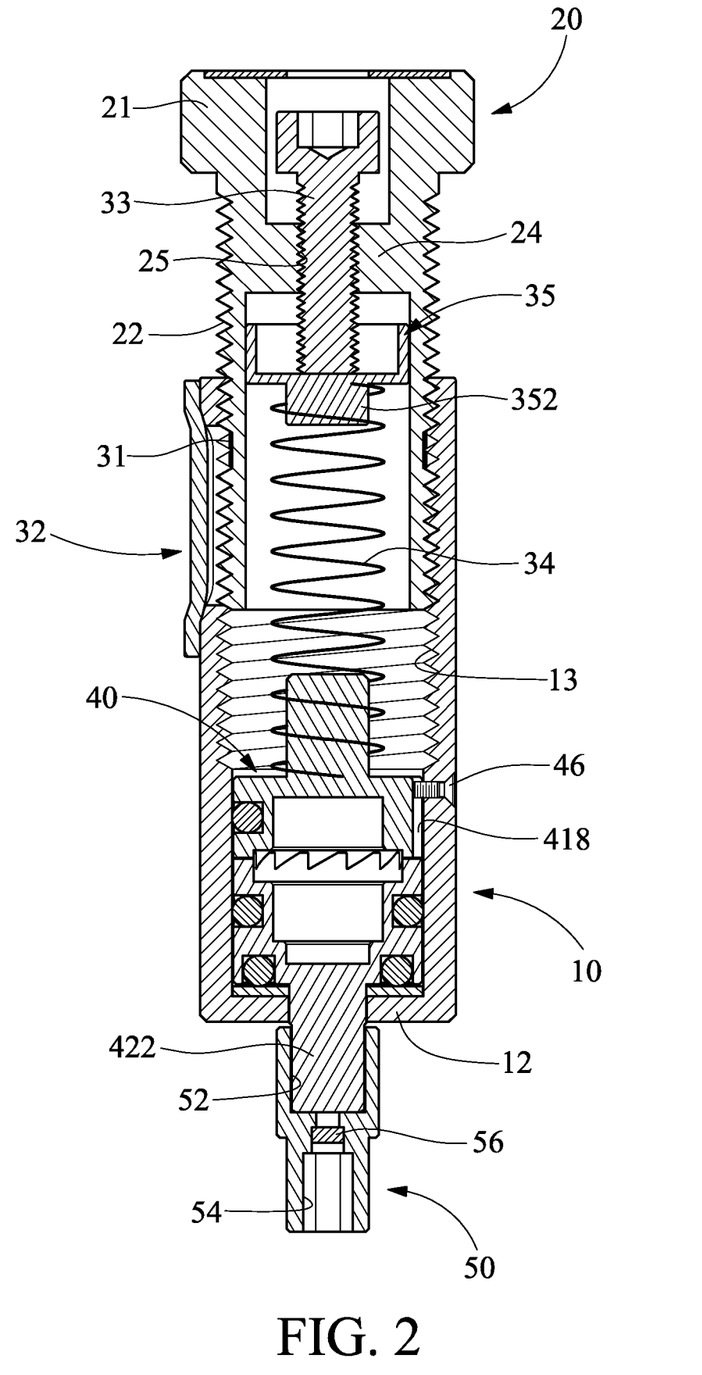
FIG. 2 is a cut-away view of the torque-adjusting mechanism shown in FIG. 1.
Figure 3:
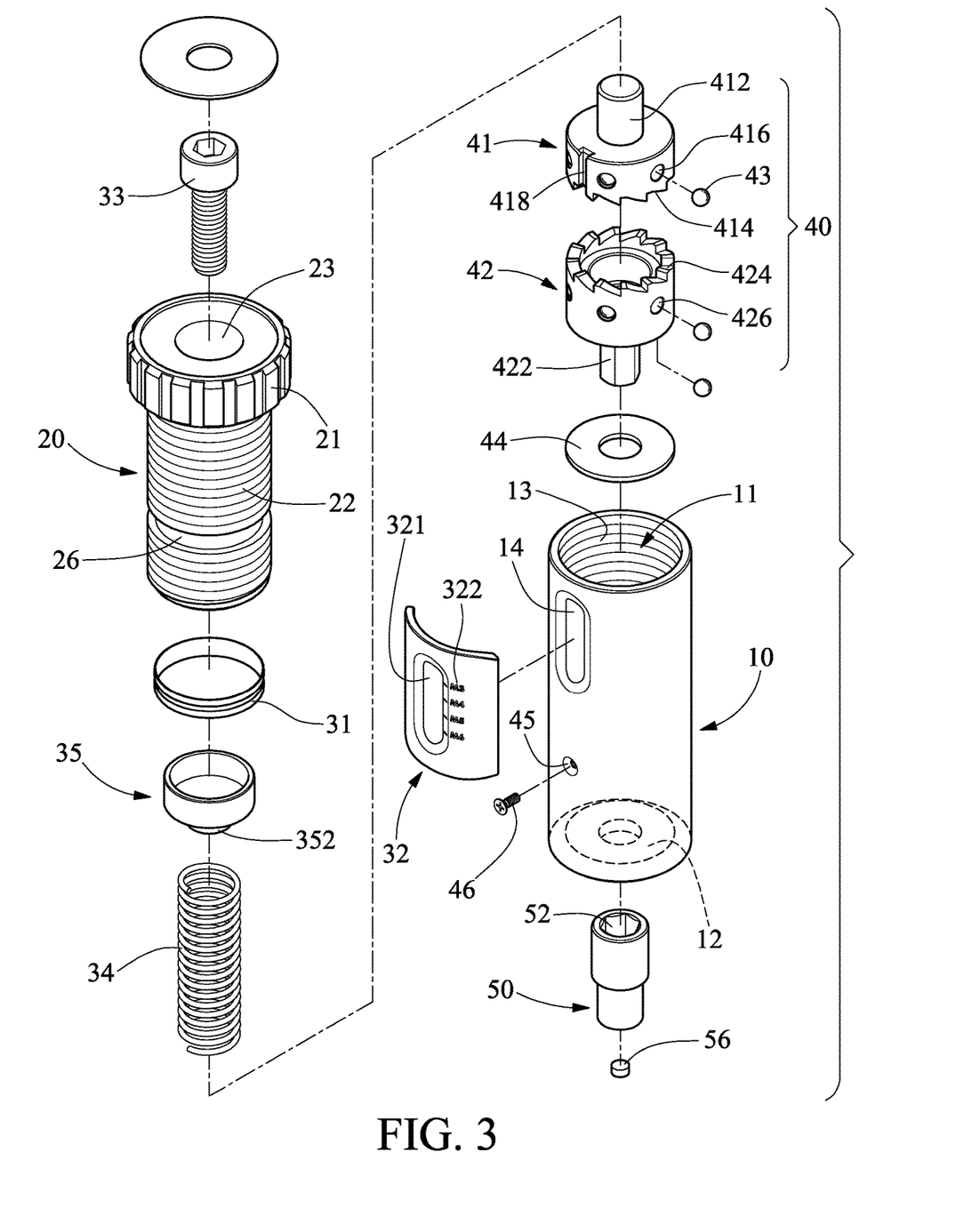
FIG. 3 is an exploded view of the torque-adjusting mechanism shown in FIG. 1.
Figure 4:
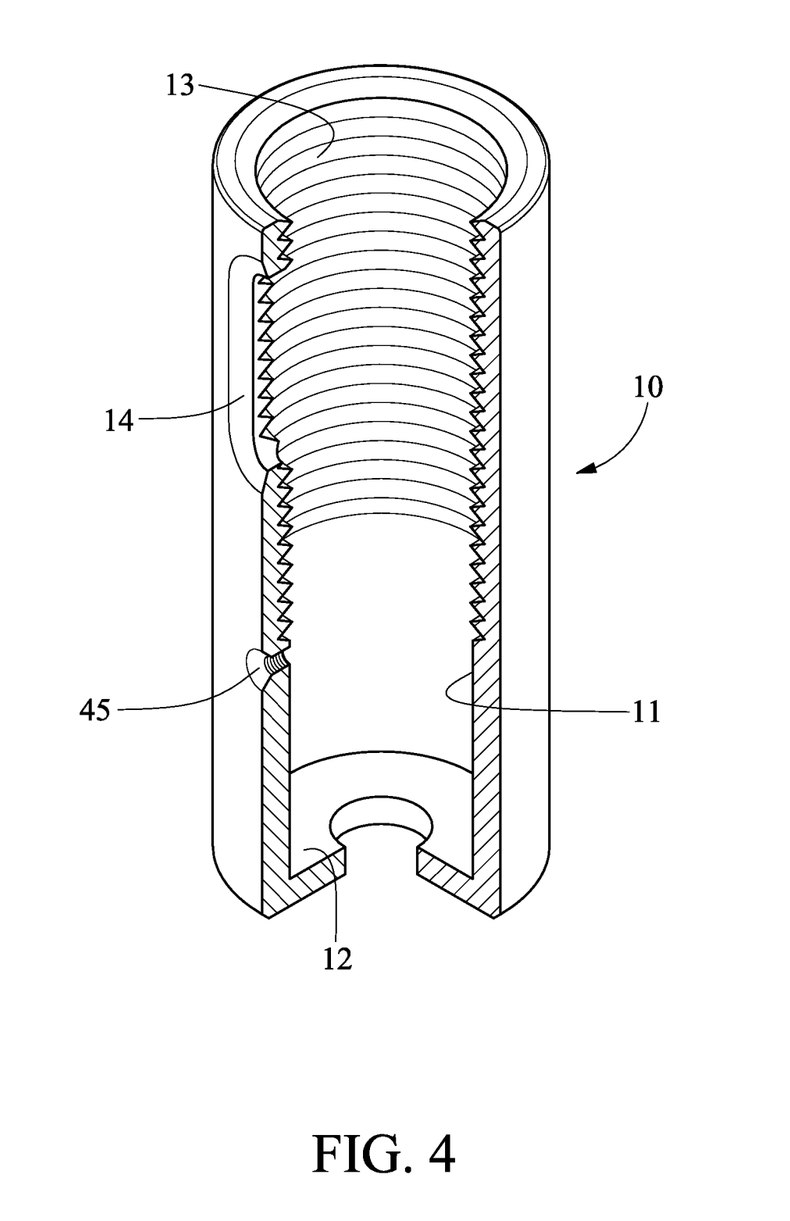
FIG. 4 is a cut-away view of a shell of the torque-adjusting mechanism shown in FIG. 1.
Figure 5:
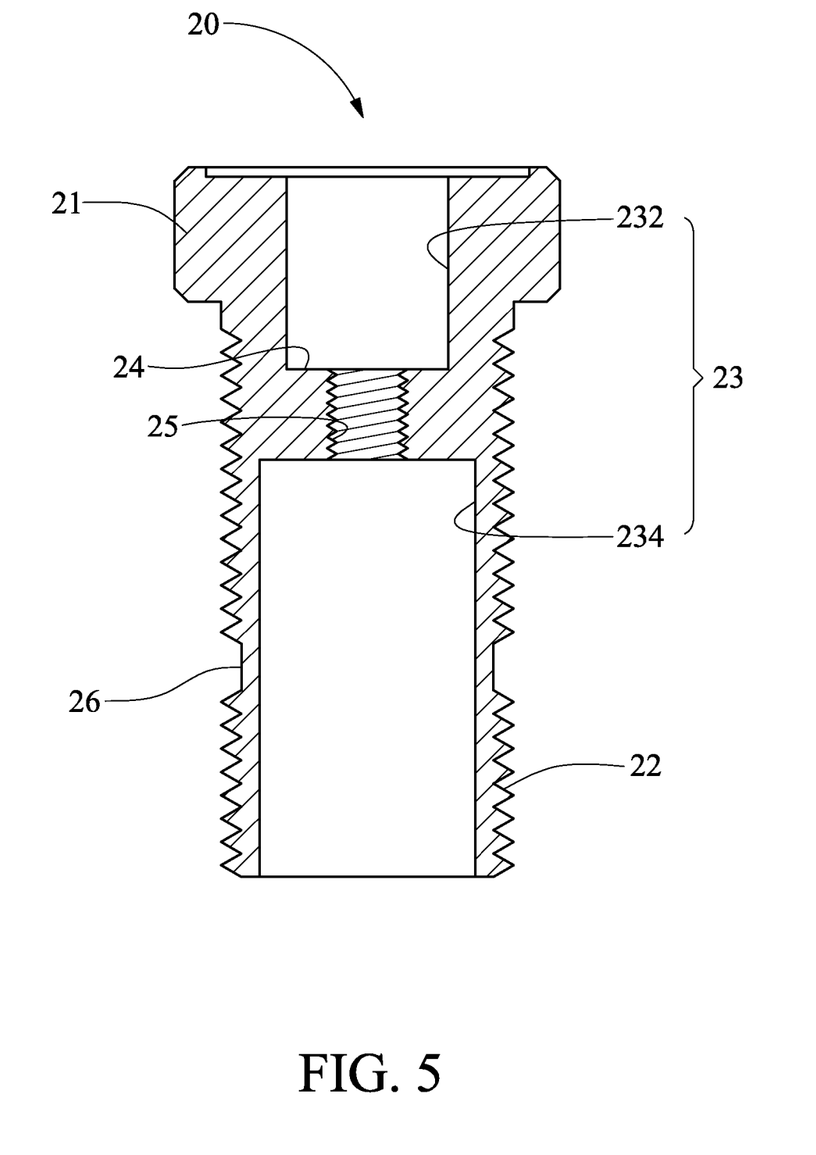
FIG. 5 is a cross-sectional view of a primary adjuster of the torque-adjusting mechanism shown in FIG. 1.

Referring to FIGS. 2 and 3, the indicator 31 is in the form of a ring movably inserted in the annular groove 26 of the primary adjuster 20. The indicator 31 is connected to and movable with the primary adjuster 20. The indicator 31 can however be omitted in as well as the window 14.

Figure 1:
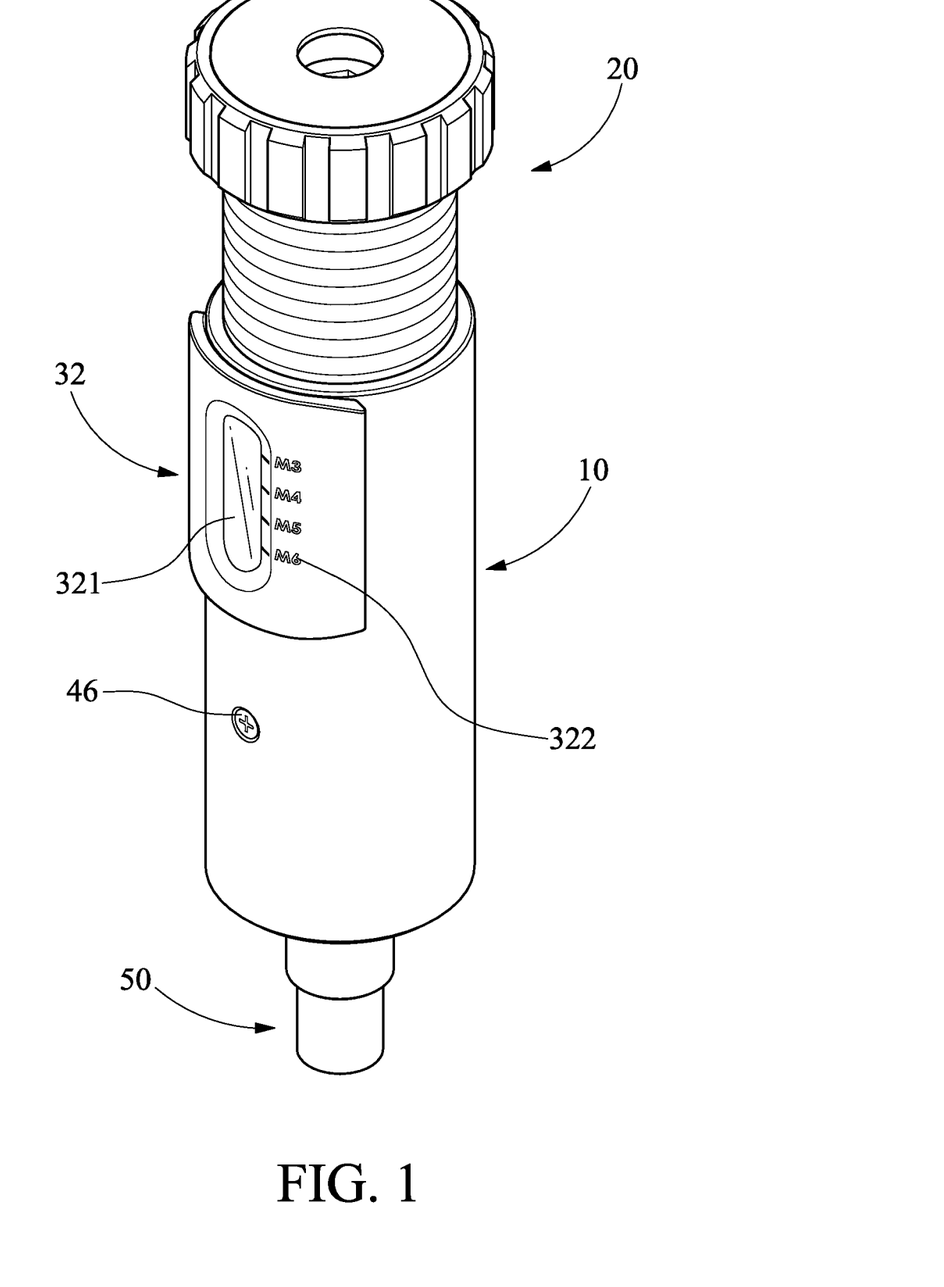
FIG. 1 is a perspective view of a torque-adjusting mechanism according to the first embodiment of the present invention.

Referring to FIGS. 1 through 3, the panel 32 is connected to the shell 10. The panel 32 includes at least one lens 321 corresponding to the window 14 and a scale 322 in the vicinity of the lens 321. Thus, no foreign matter can enter the shell 10 via the window 14. Moreover, the indicator 31, which is inserted in the shell 10, is observable through the window 14 and the lens 321. The location of the indicator 31 relative to the scale 322 is used to indicate a maximum value of torque allowed to be transmitted through the torque-adjustable taping apparatus. The panel 32 can however be omitted in another embodiment wherein the scale 322 can be formed on the shell 10 in the vicinity of the window 14.

Referring to FIGS. 2 and 3, the minor adjuster 33 is in the form of a screw inserted in the screw hole 25.

Referring to FIGS. 2 and 3, the spring 34 is inserted in the lower section 234 of the axial bore 23 of the primary adjuster 20. The spring 34 is preferably a helical spring.

Referring to FIGS. 2 and 3, the connector 35 is also inserted in the lower section 234 of the axial bore 23 of the primary adjuster 20. The connector 35 is located between the minor adjuster 33 and the spring 34. The connector 35 is compressed between the spring 34 and the minor adjuster 33 so that the connector 35 is movable in the axial bore 23 axially. The connector 35 includes a positioning boss 352 extending from a lower face. The positioning boss 352 is inserted in an upper end of the spring 34.

Referring to FIGS. 2 and 3, the clutch 40 includes an upper gear 41, a lower gear 42, several balls 43, a washer 44, a screw hole 45 and a screw 46.

The upper gear 41 is inserted in the axial hole 11. The upper gear 41 includes an upper face in contact with a lower end of the spring 34. Preferably, the upper gear 41 includes a positioning rod 412 and teeth 414 on a lower face. The positioning rod 412 is inserted in the lower end of the spring 34. The upper gear 41 further includes recesses 416 and a restraining cutout 418 in the periphery. The teeth 414 are arranged in a circle. The recesses 416 movably receive balls 43. The restraining cutout 418 extends parallel to an axis of the upper gear 41.

The lower gear 42 is located below the upper gear 41 in the axial hole 11. The lower gear 42 includes a connective rod 422 extending from a lower face, teeth 424 extending from an upper face, and recesses 426 made in the periphery. The connective rod 422 extends out of the shell 10 through the aperture of the annular portion 12. The teeth 424 of the lower gear 42 are engaged with the teeth 414 of the upper gear 41. Preferably, the teeth 412 and 422 are asymmetric teeth. The recesses 426 movably receive other balls 43.

The washer 44 is located around the connective rod 422 of the lower gear 42. The washer 44 is located between the lower face of the lower gear 42 and an upper face of the annular portion 12 of the shell 10.

Figure 6:
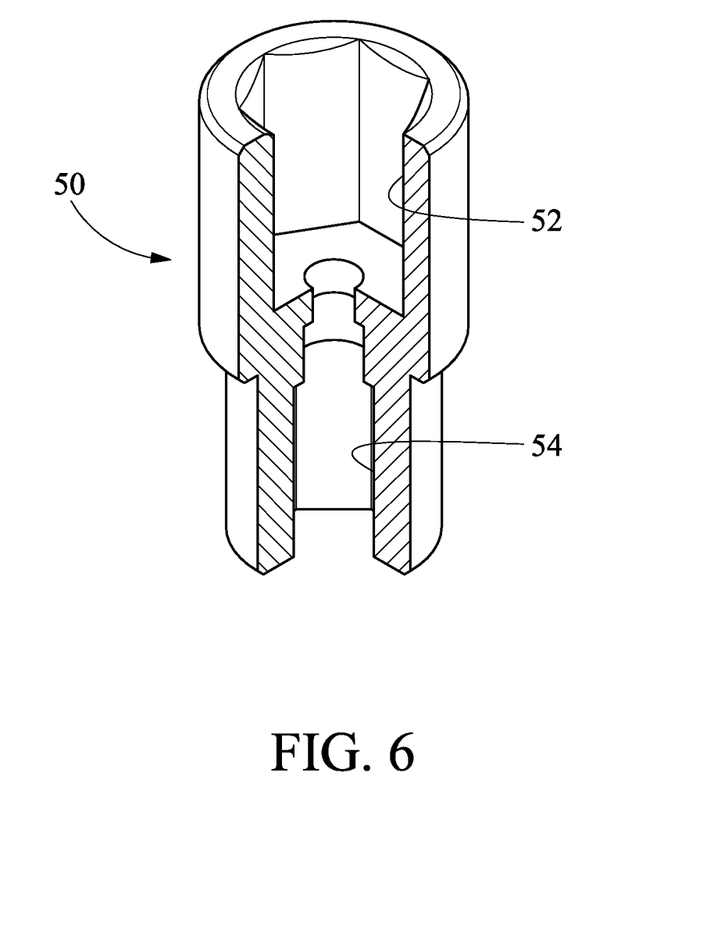
FIG. 6 is a cut-away view of a joint of the torque-adjusting mechanism shown in FIG. 1.

Referring to FIGS. 2, 3 and 6, the joint 50 includes an upper cavity 52 in an upper face and a lower cavity 54 in a lower face. The upper cavity 52 receives the connective rod 422. The upper cavity 52 and the connective rod 422 are non-circular and, more preferably, hexagonal so that the joint 50 is rotatable with the lower gear 42. The lower cavity 54 is used to receive the tap. Preferably, the upper cavity 52 further includes a magnet 56 in each of the upper and lower cavities 52 and 54 to attract the connective rod 422 or the tap.

The screw hole 45 is made throughout the shell 10 in a radial direction. Thus, the screw hole 45 is in communication with the axial hole 11.

The screw 46 is inserted in screw hole 45. The screw 46 includes an external end located out of the shell 10 and an internal end inserted in the shell 10. The internal end of the screw 46 is inserted in the restraining cutout 418 so that the upper gear 41 is only movable axially in the shell 10, not rotatable relative to each other. That is, the upper gear 41 is rotatable with the shell 10. There can be more than one screw 46, the shell 10 can accordingly include more than one screw hole 45 and the upper gear 41 can accordingly include more than one restraining cutout 418 in another embodiment.

Figure 7:
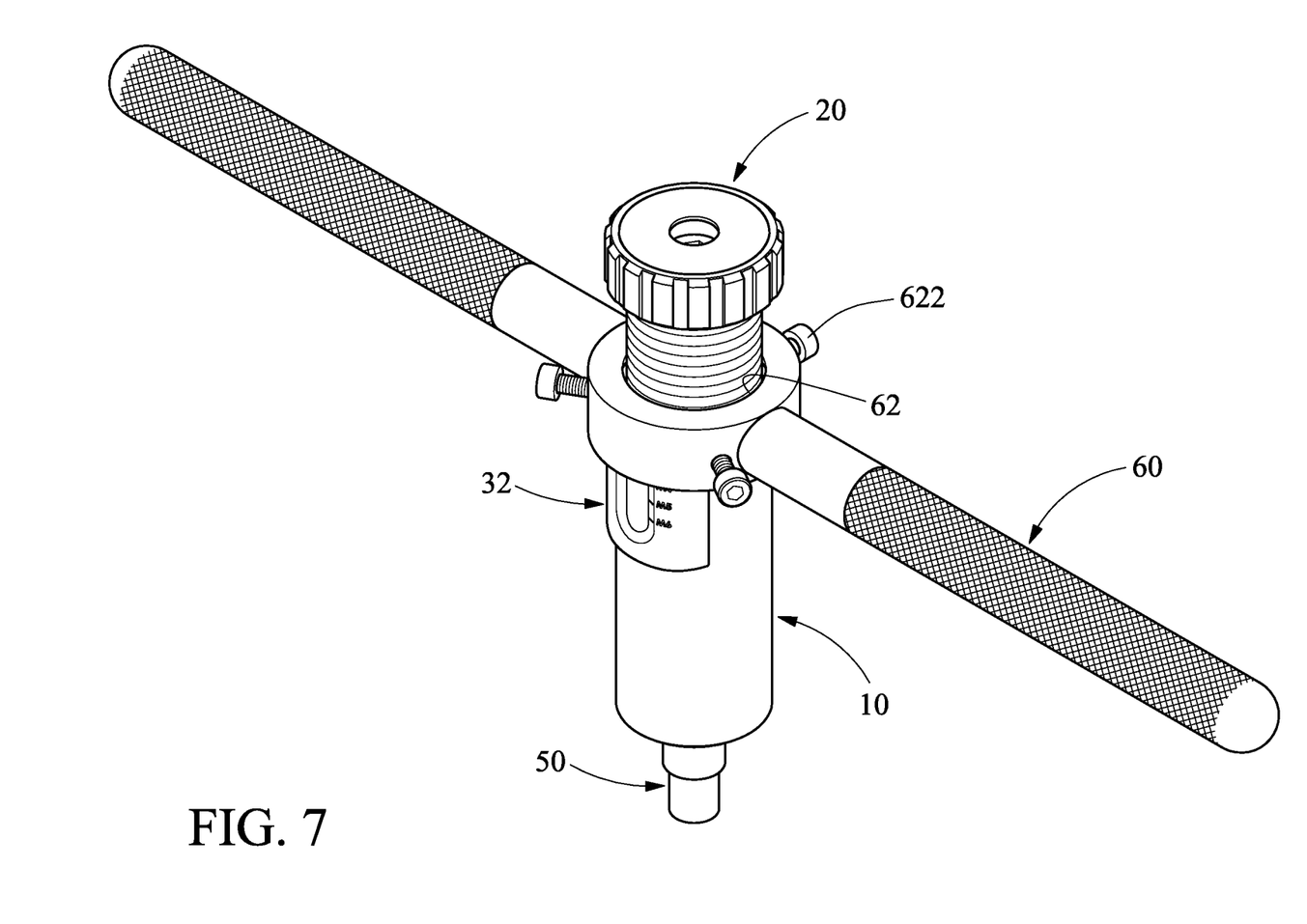
FIG. 7 is a perspective view of a torque-adjustable tapping apparatus including the torque-adjusting mechanism shown in FIG. 1.

Referring to FIG. 7, the wrench 60 includes a collar 62 and screws 622. The collar 62 is formed with screw holes (not numbered) for receiving the screws 622. Each of the screws 622 includes an external end located out of the collar 62 and an internal end inserted in the collar 62.

In operation, the collar 62 is provided on the shell 10. The screws 622 are tightened in the screw holes of the collar 62 so that the internal end of each of the screws 622 is abutted against the shell 10 and that the wrench 60 is rotatable with the shell 10. An upper end of the tap 92 is inserted in the lower cavity 54 of the joint 50. The upper end of the tap 92 and the upper cavity 52 are non-circular and, more preferably, hexagonal so that the tap 92 is rotatable with the joint 50. A user can maneuver the wrench 60 to rotate the tap 92 via the torque-adjusting mechanism.

The user can use the primary adjuster 20 to adjust a maximum value of torque that can be transmitted to the tap 92 from the wrench 60 via the torque-adjusting mechanism and, more particularly, the spring 34 and the clutch 40. The indicator 31 is moved up and down as the primary adjuster 20 is moved up and down in the axial hole 11. The user can know the maximum value of torque by observing the location of the indicator 31 relative to the scale 322. The user can further use the minor adjuster 33 to change the location of the connector 35 in the axial bore 23, i.e., adjust the compression of the spring 34 and the engagement of the upper gear 41 with the lower gear 42. Thus, the maximum value of torque is adjusted. The adjustment by using the minor adjuster 33 is mild in comparison with the adjustment by using the primary adjuster 20.

In tapping, the upper gear 41 is engaged with the lower gear 42 so that the rotation of the wrench 60 causes the rotation of the tap 92 through the clutch 40. When the clutch 40 is subjected to a value of torque larger than the maximum value of torque, the upper gear 41 is disengaged from and rotated relative to the lower gear 42 so that the rotation of the wrench 60 does not cause the rotation of the tap 92 through the clutch 40. That is, the tap 92 is not subjected to the value of torque larger than the maximum value of torque. Thus, the tap 92 is protected from fracture.

Figure 8:
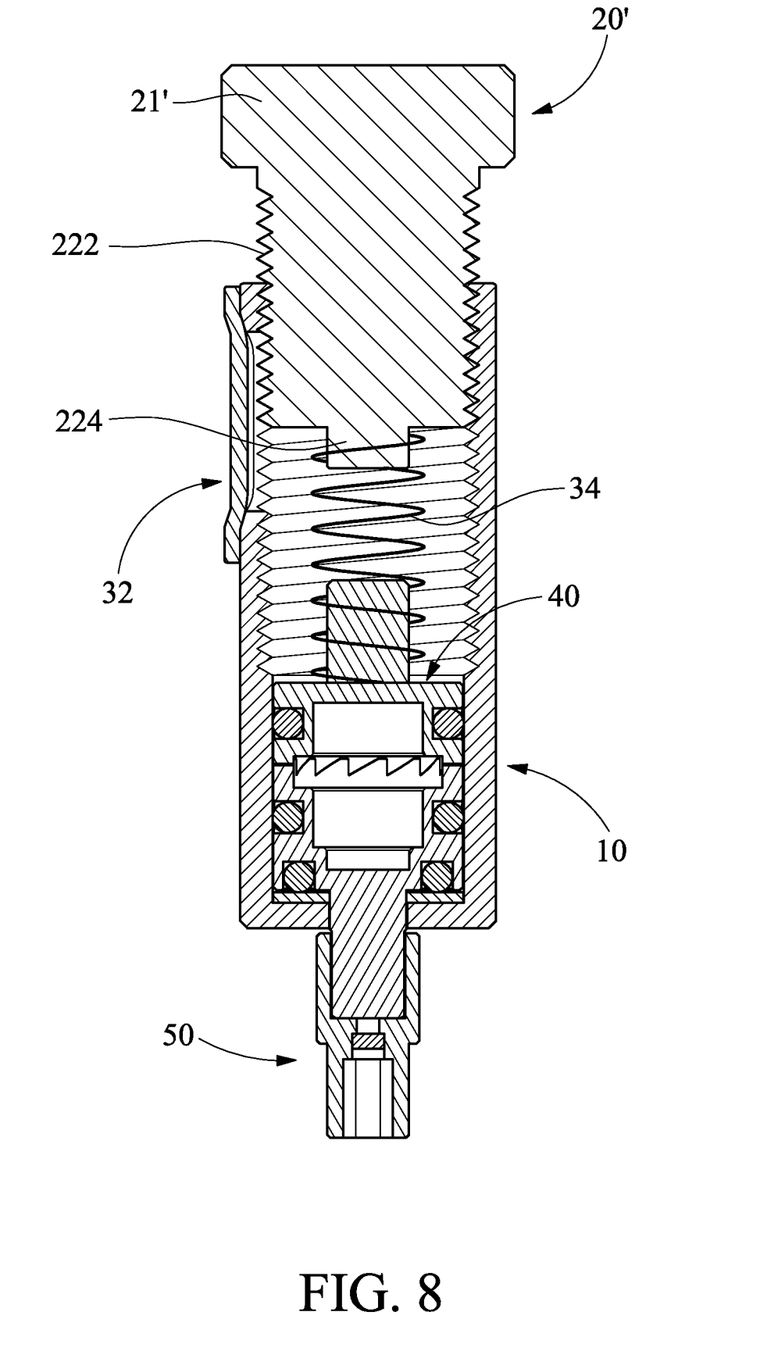
FIG. 8 is a cross-sectional view of a torque-adjusting mechanism according to the second embodiment.

Referring to FIG. 8, there is a torque-adjustable tapping apparatus according to a second embodiment of the present invention. The second embodiment is like the first embodiment except for two things. Firstly, the connector 35 is omitted. Secondly, a primary adjuster 20' is used instead of the primary adjuster 20.

The primary adjuster 20' includes an enlarged head 21', an externally threaded section 222 extending from the enlarged head 21', and a positioning boss 224 extending from the externally threaded section 222. The externally threaded section 222 is engaged with the internally threaded section 13. The positioning boss 224 is inserted in the upper end of the spring 34. The positioning boss 224 can however be omitted in another embodiment.

Figure 9:
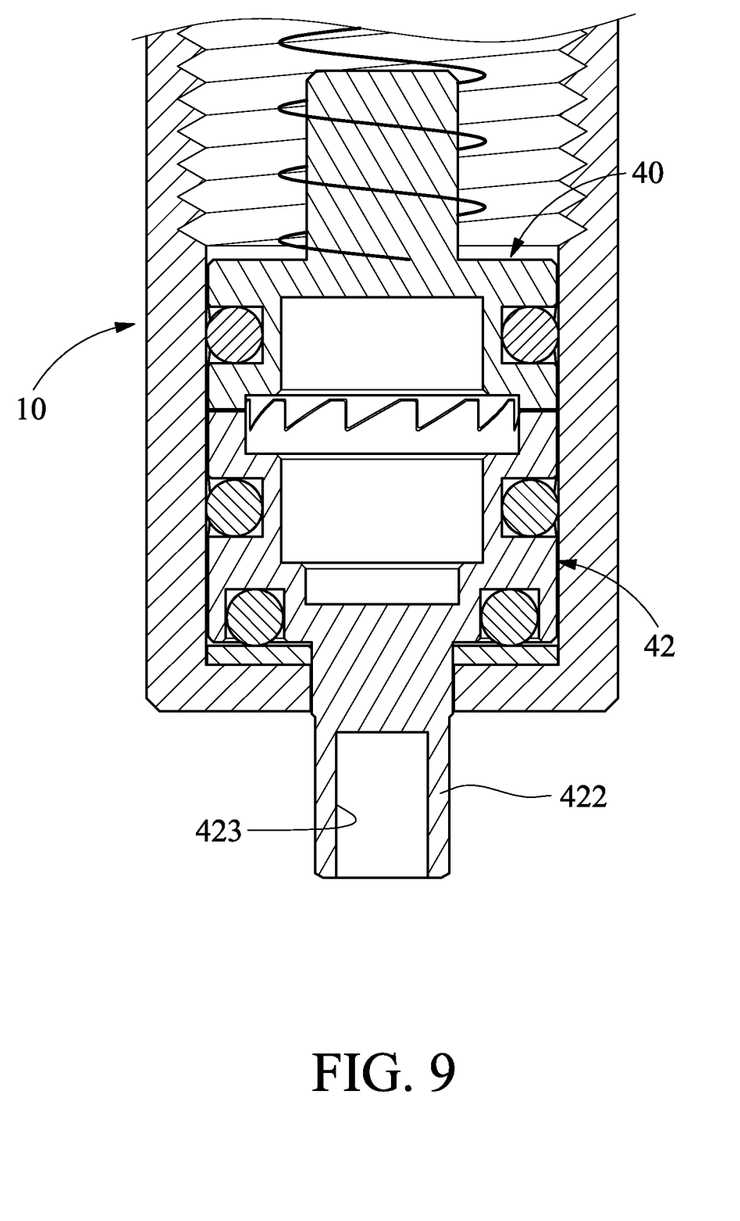
FIG. 9 is a partial cross-sectional view of a torque-adjusting mechanism according to the third embodiment.

Referring to FIG. 9, there is a torque-adjustable tapping apparatus according to a third embodiment of the present invention. The third embodiment is like the first embodiment except for two things. Firstly, the joint 50 is omitted. Secondly, the connective rod 422 of the lower gear 42 includes a recess 423 for receiving the upper end of the tap.

The present invention has been described via the illustration of the embodiments. Those skilled in the art can derive variations from the embodiments without departing from the scope of the present invention. Hence, the embodiments shall not limit the scope of the present invention defined in the claims.

The invention claimed is:

1. A torque-adjustable tapping apparatus comprising:
   a tap;
   a wrench; and
   a torque-adjusting mechanism comprising:
      a shell connected to the wrench and comprising:
         an axial hole made throughout the shell in an axial direction;
         an annular portion formed at an end of the shell;
         an internally threaded section formed on an internal face of the shell; and
         a screw hole made throughout the shell in a radial direction and in communication with the axial hole;
      a primary adjuster comprising an enlarged head and an externally threaded section extending from the enlarged head, wherein the externally threaded section is engaged with the internally threaded section;
      a clutch comprising:
         an upper gear comprising teeth extending from a lower face and at least one restraining cutout in a periphery;
         a lower gear comprising teeth extending from an upper face and a connective rod extending from a lower face, wherein the teeth of the lower gear are engaged with the teeth of the upper gear, and the connective rod is connected to the tap;
         at least one screw inserted in the restraining cutout through the screw hole; and
         a spring compressed between the primary adjuster and the upper gear, thereby pressing the upper gear against the lower gear,
      wherein the primary adjuster further comprises:
      an axial bore made throughout the primary adjuster in an axial direction;
      a partition formed on an internal face of the primary adjuster, thereby dividing the axial bore into two sections;
      a screw hole made throughout the partition in an axial direction;
      a minor adjuster in the form of a screw inserted in the screw hole of the partition; and
         a connector located between the minor adjuster and the spring.

2. The torque-adjustable tapping apparatus according to claim 1 wherein the connective rod comprises a recess for receiving an end of the tap.

3. The torque-adjustable tapping apparatus according to claim 1, further comprising a joint for connecting the connective rod to the tap.

4. The torque-adjustable tapping apparatus according to claim 1, wherein each of the upper and lower gears comprises recesses in a periphery, and the clutch further comprises balls inserted in the recesses of the upper and lower gears.

5. The torque-adjustable tapping apparatus according to claim 4, wherein the clutch further comprises a washer located around the connective rod and sandwiched between the lower gear and the annular portion.

6. The torque-adjustable tapping apparatus according to claim 1, further comprising an indicator, wherein the primary adjuster further comprises an annular groove for receiving the indicator, and the shell further comprises a window through which the indicator is observable.

7. The torque-adjustable tapping apparatus according to claim 6, further comprising a panel for covering the window of the shell.

* * * * *